United States Patent Office 3,252,178
Patented May 24, 1966

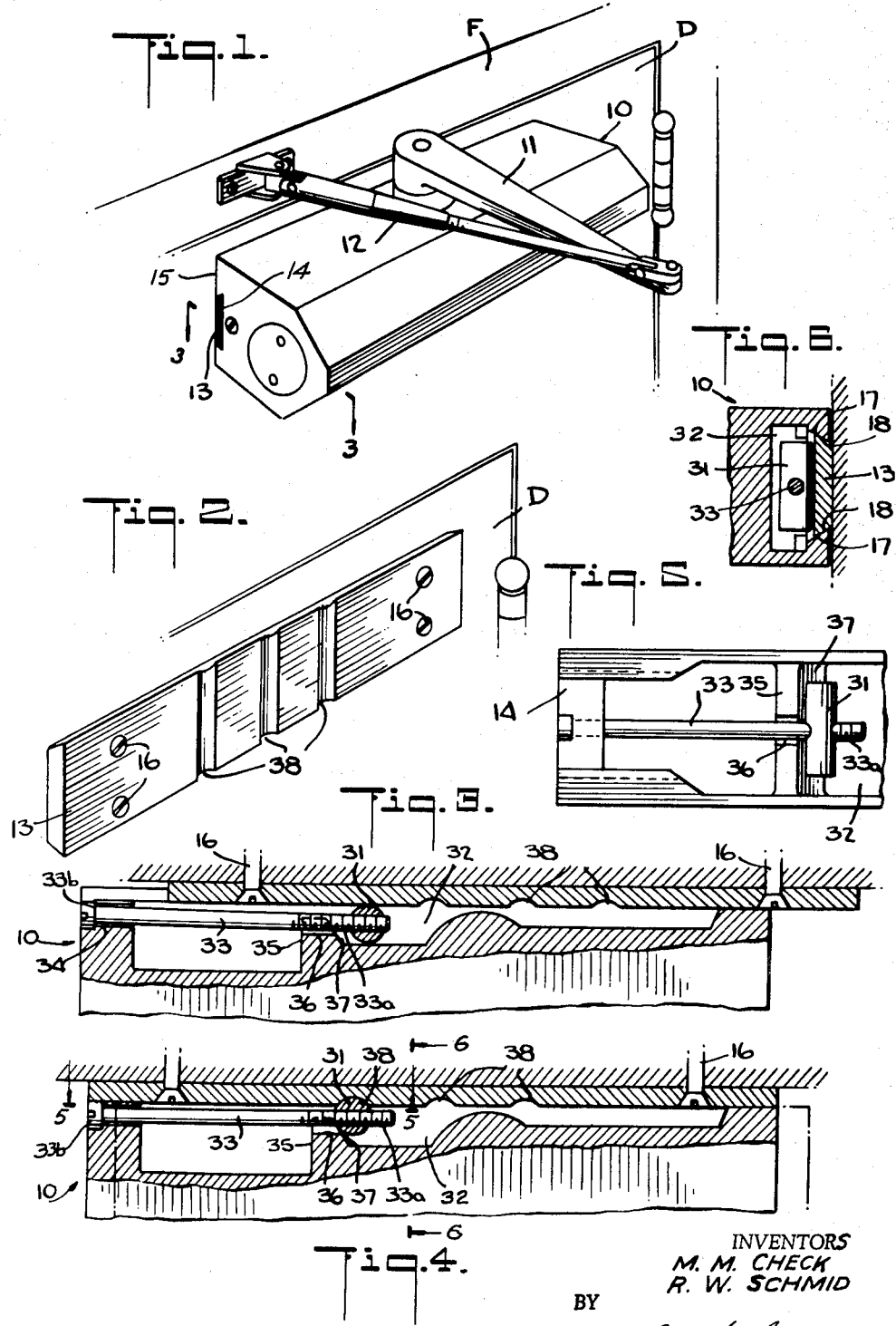

3,252,178
MOUNTING FOR DOOR CLOSER
Mathias M. Check, Strafford, and Raymond W. Schmid, Havertown, Pa., assignors, by mesne assignments, to Yale & Towne, Inc., New York, N.Y., a corporation of Ohio
Original application Feb. 27, 1961, Ser. No. 91,970, now Patent No. 3,188,682, dated June 15, 1965. Divided and this application Mar. 3, 1965, Ser. No. 442,229
3 Claims. (Cl. 16—49)

This is a division of our earlier application Serial No. 91,970, filed February 27, 1961, and now Patent No. 3,188,682.

This invention relates to a door closer, and more particularly, to a mounting for a door closer incorporating a separate mounting bracket.

It has heretofore been proposed to provide a separate mounting bracket for a door closer which could be securely fixed to the door by heavy screws, or the like, with the closer thereafter being slipped endwise onto the mounting bracket and supported on the bracket through flanges provided on the bracket which extend into grooves provided in the upper and lower sides of the closer. The closer is prevented from sliding endwise off of the bracket by means of a suitable screw extending through the flange of the bracket and threaded into the closer.

One of the advantages of a separate mounting bracket is that the heavy mounting screws are concealed by the closer body, thus enhancing the appearance of the installation. A further advantage is that end or side flanges need not be provided on the closer to receive the mounting screws, thereby reducing the overall length and width of the closer as well as improving the appearance of the closer. In addition, the use of a separate mounting plate allows the closer to be easily removed from the door for servicing.

While the use of a separate mounting bracket does provide such advantages, the use of a mounting bracket of the type heretofore proposed also creates certain problems. For example, unless the cooperating flanges on the bracket and the grooves in the sides of the closer are made to rather close tolerances, there will be clearance between the overlapping surfaces of the flanges and grooves permitting movement and play between the closer and mounting bracket, with resulting noisy operation of the closer and excessive shock on the mounting screws during operation of the closer, with chance of the mounting screws working loose. Even if the flanges of the mounting bracket and the grooves are initially made to close tolerances, they may wear on continued use of the closer with resulting play developing between the closer and mounting bracket. These problems are made more difficult by the fact that the mounting must accept very considerable amounts of torque from the closer, with the torque frequently reversing in direction. In accordance with the present invention, the problem inherent with such a mounting bracket construction is eliminated by providing means for forcing and holding the overlapping surfaces in intimate contact so as to take up all play between the closer and the mounting bracket and hold the closer and bracket against relative movement. As a feature of the invention, the same means also prevent the closer from moving endwise off of the mounting bracket.

In the preferred form of the invention, the overlapping cooperating surfaces of the bracket and closer for holding the closer on the mounting bracket are provided by a cooperative dovetail rib and dovetail groove formed on the bracket and closer, and the means of the invention force the tapered surfaces of the dovetail rib and groove into wedging engagement to effectively hold the closer against movement relative to the mounting bracket.

The invention and its advantages having been broadly described, a more detailed description of the invention is given hereafter in conjunction with the accompanying drawings, wherein:

FIG. 1 shows a perspective view of a door closer utilizing our mounting to mount the closer on a door, FIG. 2 is a perspective view showing the closer, mounting bracket when the closer is removed, FIG. 3 is a partial sectional view taken on the line 3—3 of FIG. 1 showing the closer partially slipped over the mounting bracket, FIG. 4 is a sectional view, similar to that of FIG. 3 but showing the closer completely slipped over the mounting bracket, FIG. 5 is a sectional view taken along the line 5—5 of FIG. 4, FIG. 6 is a sectional view taken along the line 6—6 of FIG. 4.

Referring to the drawings and in particular to FIG. 1, one form of the mounting structure of the invention is illustrated in conjunction with a closer 10 having an operating arm 11 which is connected to a door frame F by a link 12 in the conventional manner. As the internal operating structure of the closer 10 forms no part of the invention, it has not been illustrated, but it will be appreciated that it may be of any desired design which will return the door to closed position after the door has been opened and released.

The closer 10 is mounted on the door D by means of a separate mounting bracket 13 which is of dovetail cross section and fits into a dovetail groove 14 formed in the rear surface 15 of the closer 10.

In installing the closer 10, the mounting bracket 13 is first secured to the door D by suitable fastening means, such as the screws 16 shown in FIG. 2. The closer 10 thereafter is slipped endwise over the mounting bracket 13 with the dovetailed rib formed by the mounting bracket received in the dovetail groove 14 of the closer 10.

When so mounted on the bracket 13, the closer 10 is prevented from being pulled off the door in a direction perpendicular to the door by the overlapping tapered surfaces 17 and 18, shown in FIG. 6, that extend longitudinally and that are provided respectively by the dovetail groove 14 and the dovetail mounting bracket 13. While the overlapping surfaces 17 and 18 hold the closer on the mounting bracket 13, it will be appreciated that, unless the dovetail bracket 13 and the dovetail groove 14 of the closer are made to close tolerances and fit, there will be clearance between the surfaces 17 and 18 permitting movement and play between the closer 10 and the mounting bracket 13 resulting in noisy operation of the closer and excessive shock on the mounting screws 16 during operation of the closer.

In accordance with the invention, means are provided for forcing and holding the overlapping surfaces 17 and 18 in intimate contact so as to prevent any play or movement between the closer 10 and the bracket 13 during operation of the closer.

As shown in FIGS. 3 to 6, the means for this purpose include a cylindrical cam member 31 disposed within a recess 32 in the closer 10. A draw bolt 33 extends loosely through a hole 34 provided at one end of the closer and has a threaded inner end 33a which is threaded through the center of the cylindrical cam member 31 so that rotation of the draw bolt is effective to move the cam member 31 endwise of the closer 10.

A projection 35 provided at one end of the recess 32 has a slot 36 through which the draw bolt 33 extends and provides a tapered surface 37 against which the cam member 31 may be drawn by the draw bolt 33. When the cam member 31 is confined completely within the recess 32, as shown in FIG. 3, the closer 10 may be readily slipped over the mounting bracket 13 with the tapered surfaces 17 of the dovetail groove 14 extending behind the tapered surfaces 18 of the dovetail mounting bracket 13, as best shown in FIG. 6.

When the closer 10 has been properly positioned on the mounting bracket 13, as shown in FIG. 4, the draw bolt 33 may be rotated through its slotted head 33b to draw the cam member 31 against the tapered surface 37 to force the cam member 33 outwardly of the recess 32 which opens to the rear of the closer so that the cam member 31 is forced against the surface of the mounting bracket 13. This forces the closer 10 away from the mounting bracket 13 to take up all clearance between the tapered surfaces of 17 and 18 and wedges the surfaces 17 and 18 tightly together to effectively hold the closer 10 against movement relatively to the mounting bracket 13. As best shown in FIG. 5, the dovetail groove 14 in the closer may be discontinuous with a portion merely provided adjacent each end of the closer 10.

Preferably, the mounting bracket 13 is provided with one or more recesses 38 into which the cam member 31 may engage to thereby key the closer 10 to the mounting bracket 13 to prevent endwise movement thereof relatively to the mounting bracket 13. The provision of more than one recess 38 permits the closer to be keyed or locked against endwise movement in more than one position relatively to the mounting bracket to provide for adjustment in the position of the closer on the door.

From the preceding description, it can be seen there is provided an improved mounting for a door closer which while incorporating a separate mounting bracket to obtain the advantages thereof, also provides means for effectively preventing movement or play between the closer and mounting bracket in a direction perpendicular to the door which would result in noisy operation of the door closer and shock load on the mounting screws during operation of the closer. At the same time, the means for preventing such movement or play between the closer and mounting bracket also effectively prevents endwise movement of the closer relatively to the mounting bracket.

While one form of the invention has been shown and described, it will be appreciated that this is for the purpose of illustration and that changes and modifications can be made in the specific form of the invention shown and described without departing from the spirit and scope of the invention.

We now claim:

1. A door closer assembly comprising, a closer having an arm through which the closer may apply closing torque to a door, a mounting bracket adapted to be secured to a door, a cooperative dovetail groove and dovetail rib on said closer and mounting bracket providing two sets of tapered surfaces on said closer and mounting bracket which overlap to hold said closer on said mounting bracket when said closer is slipped endwise on said mounting bracket so that the dovetail rib is received in the dovetail groove with the tapered surfaces of the closer behind the tapered surfaces of the mounting bracket, a recess in said closer opening to said mounting bracket, a cam member in said recess, an inclined surface at one end of said recess, a bolt extending inwardly from one end of said closer and having an end threaded through said cam member whereby rotation of said bolt draws said cam member against said inclined surface to move said cam member outwardly of said recess against said mounting bracket to force said closer away from said mounting bracket and wedge and hold both sets of said tapered surfaces tightly together.

2. A door closer assembly comprising, a closer having an arm through which the closer may apply closing torque to a door, a mounting bracket adapted to be secured to a door, a cooperative dovetail groove and dovetail rib on said closer and mounting bracket providing two sets of tapered surfaces on said closer and mounting bracket which overlap to hold said closer on said mounting bracket when said closer is slipped endwise on said mounting bracket so that the dovetail rib is received in the dovetail groove with the tapered surfaces of the closer behind the tapered surfaces of the mounting bracket, a recess in said closer opening to said mounting bracket, a cam member in said recess, an inclined surface at one end of said recess, a bolt extending inwardly from one end of said closer and having an end threaded through said cam member whereby rotation of said bolt draws said cam member against said inclined surface to move said cam member outwardly of said recess against said mounting bracket to force said closer away from said mounting bracket and wedge and hold both sets of said tapered surfaces tightly together, and recesses in said mounting bracket in which said cam member is adapted to engage to prevent endwise movement of said closer relatively to said mounting bracket.

3. A door closer assembly comprising, a closer having an arm through which the closer may apply closing torque to a door, a mounting bracket adapted to be secured to a door, a cooperative dovetail groove and dovetail rib on said closer and mounting bracket providing two sets of tapered surfaces on said closer and mounting bracket which overlap to hold said closer on said mounting bracket when said closer is slipped endwise on said mounting bracket so that the dovetail rib is received in the dovetail groove with the tapered surfaces of the closer behind the tapered surfaces of the mounting bracket, a recess in opposed relation to the mounting bracket in said closer, a cam member adapted to coact with a surface in said recess, a further recess formed in the mounting bracket and adapted to be aligned with said cam member when the closer is slipped onto said bracket, a bolt extending inwardly from one end of said closer and having an end engaging said cam member so that rotation of said bolt presses said cam member against its coacting surface and cams said member into said further recess in the bracket, and said cam member then coacting with said further recess positively to lock the closer against endwise movement while forcing said closer away from said mounting bracket to wedge and to hold both sets of said tapered surfaces tightly together.

References Cited by the Examiner

UNITED STATES PATENTS

| | | | |
|---|---|---|---|
| 1,252,207 | 1/1918 | Walker | 248—224 |
| 1,363,321 | 12/1920 | Jaeger | 248—225 |
| 2,723,416 | 11/1955 | Schlage | 16—52 |
| 2,820,241 | 1/1958 | Schlage | 16—49 |
| 2,893,676 | 7/1959 | Connors et al. | 248—225 |

JOSEPH D. SEERS, *Primary Examiner.*

BOBBY R. GAY, *Examiner.*